United States Patent
Lyon et al.

(10) Patent No.: US 8,676,963 B1
(45) Date of Patent: Mar. 18, 2014

(54) DETERMINING AN ATTRIBUTE OF A TARGET COMPUTER

(75) Inventors: Gordon J. Lyon, Palo Alto, CA (US); Lei Zhao, Shenzhen (CN)

(73) Assignee: Insecure.Com LLC, Sunnyvale, CA (US)

( * ) Notice: Subject to any disclaimer, the term of this patent is extended or adjusted under 35 U.S.C. 154(b) by 1586 days.

(21) Appl. No.: 11/881,997

(22) Filed: Jul. 30, 2007

Related U.S. Application Data

(60) Provisional application No. 60/834,413, filed on Jul. 31, 2006.

(51) Int. Cl.
*G06F 15/173* (2006.01)
*G06F 11/00* (2006.01)

(52) U.S. Cl.
USPC ............................................ 709/224; 726/22

(58) Field of Classification Search
USPC ...................................... 709/224; 726/22–25
See application file for complete search history.

(56) References Cited

U.S. PATENT DOCUMENTS

| | | | |
|---|---|---|---|
| 7,801,980 B1 * | 9/2010 | Roesch et al. ................ | 709/224 |
| 7,912,940 B2 * | 3/2011 | LeBlanc et al. ............... | 709/224 |
| 2003/0123447 A1 * | 7/2003 | Smith ............................ | 370/394 |
| 2004/0015728 A1 * | 1/2004 | Cole et al. .................... | 713/201 |
| 2004/0107219 A1 | 6/2004 | Rosenberger | |
| 2005/0063302 A1 * | 3/2005 | Samuels et al. ............... | 370/229 |
| 2005/0086522 A1 | 4/2005 | Rowland | |
| 2006/0242704 A1 * | 10/2006 | Aviani et al. .................... | 726/23 |

OTHER PUBLICATIONS

Ofer Arkin, ICMP Usage in Scanning, Jun. 2001 The Sys-Security Group, Version 3.0, pp. 1-218.*
Network Partners, Too Small Window Size, http://www.routers.com/References/TCPwindowSize.html, Feb. 26, 2005.*
Elie, TCP Timestamp to Count Hosts Behind NAT, Last modified Aug. 28, 2005, http://docdroppers.org.
Robert Beverly, A Robust Classifier for Passive TCP/IP Fingerprinting, Proceedings of the 5th Passive and Active Measurement Workshop, Juan-les-Pins, France, Apr. 2004.
Peter Phaal, Detecting NAT Devices using sFlow, http://www.sflow.org/detectNAT/.
Tenable Network Security, Nessus 3.0 Client Guide, Mar. 31, 2006, Revision 3.
Tenable Network Security, Nessus 3.0 Advanced User Guide, Mar. 31, 2006, Revision 4.
Tenable Network Security, Nessus 3.0 Installation Guide, Mar. 31, 2006, Revision 14.
Daiji Sanai, Detection of Promiscuous Nodes Using ARP Packets, Version 1.0, Aug. 31, 2001.
Fyodor, Remote OS Detection via TCP/IP Stack FingerPrinting, Written: Oct. 18, 1998, Last Modified: Jun. 11, 2002, http://insecure.org/nmap/nmap-fingerprinting-old.html.

(Continued)

*Primary Examiner* — Chirag R Patel

(74) *Attorney, Agent, or Firm* — Van Pelt, Yi & James LLP

(57) ABSTRACT

Determining an attribute of a target computer is disclosed. A first ICMP query is set to a first state. A second ICMP query is set to a second state. The first and second ICMP queries are sent to the target computer. Responses associated with the first and second ICMP queries that are received from the target computer are combined. An attribute of the target computer is determined based on the combination of the responses.

20 Claims, 20 Drawing Sheets

(56) References Cited

OTHER PUBLICATIONS

Arkin et al., ICMP Based Remote OS TCP/IP Stack Fingerprinting Techniques, Phrack Inc., Issue 57, Nov. 8, 2001.

Arkin et al., Xprobe v2.0, A "Fuzzy" Approach to Remote Active Operating System Fingerprinting, Aug. 2002.

NMAP v. 4.03 MAN page, Network exploration tool and security/port scanner, Apr. 22, 2006.

U.S. Appl. No. 11/881,998 Office Action mailed Jul. 24, 2009.

* cited by examiner

| Value | Description | |
|---|---|---|
| N | Neither of the responses have the DF bit set. | — 352 |
| S | Both responses echo the DF value of the probe. | — 354 |
| Y | Both of the response DF bits are set. | — 356 |
| O | Other. | — 358 |

FIG. 3B

| Value | Description | |
|---|---|---|
| Z | Both TOS values are zero | ⌐ 452 |
| S | Both TOS values are each the same as in the corresponding probe | ⌐ 454 |
| NN | Both use the same non-zero number, NN | ⌐ 456 |
| O | Other | ⌐ 458 |

FIG. 4B

| Value | Description | |
|---|---|---|
| Z | Both CODE values are zero | — 552 |
| S | Both CODE values are each the same as in the corresponding probe | — 554 |
| NN | Both use the same non-zero number, NN | — 556 |
| O | Other | — 558 |

FIG. 5B

| Value | Description | |
|---|---|---|
| Z | Neither response includes any data | — 652 |
| S | Both responses return all data sent in the corresponding request | — 654 |
| NN | If at least one of the responses truncates the data, the largest amount of data returned (in either packet) is stored here. When they both truncate the data length to the same non-zero number, it is stored here. | — 656 |

FIG. 6B

| Value | Description | |
|-------|-------------|---|
| Z | Both sequence number values are zero | 752 |
| S | Both sequence number values are each the same as in the corresponding probe | 754 |
| NNN | Both use the same non-zero number, NNN | 756 |
| O | Other | 758 |

FIG. 7B

| Value | Description | |
|---|---|---|
| Z | Both IP ID numbers are zero | 852 |
| NNNN | Both IP ID numbers are the same non-zero number, NNNN | 854 |
| RI | The system uses a random increment algorithm | 856 |
| BI | The system increments using host byte order rather than network byte order | 858 |
| I | The system uses single increments | 860 |
| Unclassified | None of the above apply | 862 |

FIG. 8B

```
SCAN(V=4.20ALPHA%D=10/1%OT=80%CT=1%CU=36069%PV=Y%DS=1%G=Y%M=001839%TM=45205DD5%P=x86_64-unknown-linux-gnu)
SEQ(SP=C2%GCD=1%ISR=CA%TI=Z%II=I%TS=7)
OPS(O1=M5B4ST11NW0%O2=M5B4ST11NW0%O3=M5B4NNT11NW0%O4=M5B4ST11NW0%O5=M5B4ST11NW0%O6=M5B4ST11)
WIN(W1=16A0%W2=16A0%W3=16A0%W4=16A0%W5=16A0%W6=16A0)
ECN(R=Y%DF=Y%T=40%W=16D0%O=M5B4NNSNW0%CC=N%Q=)
T1(R=Y%DF=Y%T=40%S=O%A=S+%F=AS%RD=0%Q=)
T2(R=N)
T3(R=Y%DF=Y%T=40%W=16A0%S=O%A=S+%F=AS%O=M5B4ST11NW0%RD=0%Q=)
T4(R=Y%DF=Y%T=40%W=0%S=A%A=Z%F=R%O=%RD=0%Q=)
T5(R=Y%DF=Y%T=40%W=0%S=Z%A=S+%F=AR%O=%RD=0%Q=)
T6(R=Y%DF=Y%T=40%W=0%S=A%A=Z%F=R%O=%RD=0%Q=)
T7(R=Y%DF=Y%T=40%W=0%S=Z%A=S+%F=AR%O=%RD=0%Q=)
U1(R=Y%DF=N%T=40%TOS=C0%IPL=164%UN=0%RIPL=G%RID=G%RIPCK=G%RUCK=G%RUL=G%RUD=G)
IE(R=Y%DFI=N%T=40%TOSI=S%CD=S%SI=S%DLI=S)
```

Fingerprint Sony AIBO ERS-7 running AIBO Mind 2 ⌒1002
Class Sony | embedded || robotic pet ⌒1006
SEQ(CL=RI%SP=C-E%GCD=<5%TI=I%II=I%SS=O%TS=1KHZ)
OPS(O1=M5B4NW|W1OM5B4T1OS%O2=M5B4NW|M5B4T11W%O3=M5B4NW|M5B4ST11NW0%O4=M5B4ST11NW0%O5=M5B4ST11NW0)
WIN(W1=4470%W2=41A0%W3=41A0%W4=4362%W4=39D4%W5=371F)
ECN(R=Y%DF=Y%T=40%W=0%O=M5B4S%TG=40%CC=N%Q=)
T1(R=Y%DF=Y%T=40%TG=40%W=7FFF%S=O%A=S+%F=AS%O=M5B4ST11NW2%RD=0%Q=)
T2(R=N)
T3(R=Y%DF=Y%T=40%TG=40%W=7FFF%S=O%A=S+%F=AS%O=M5B4ST11NW2%RD=0%Q=)
T4(R=Y%DF=Y%T=40%TG=40%W=0%S=A%A=O%F=R%O=%RD=0%Q=)
T5(R=Y%DF=Y%T=40%TG=40%W=0%S=Z%A=S+%F=AR%O=%RD=0%Q=)
T6(R=Y%DF=Y%T=40%TG=40%W=0%S=A%A=O%F=R%O=%RD=0%Q=)
T7(R=Y%DF=Y%T=40%TG=40%W=0%S=Z%A=S+%F=AR%O=%RD=0%Q=)
U1(DF=N%T=40%TG=40%TOS=CO%IPL=164%UN=0%RIPL=148%RID=E%RIPCK=E%RUCK=E%RUL=134%RUD=E)
IE(DF=N%T=40%TG=40%TOSI=S%CD=S%SI=S%DLI=S)

| Op Name | Symbol | Example | Description |
|---|---|---|---|
| Or | \| | O=\|ME\|MNNTNW | Matches if the corresponding subject fingerprint test takes the value of any of the clauses. In this example, the initial pipe symbol means that an empty options list will also match. |
| Range | - | SP=7-A | Matches if the subject fingerprint's corresponding test produces a numeric value which falls within the range specified. |
| Greater than | > | SP=>8 | Matches if the subject fingerprint's corresponding test produces a numeric value which is greater than the one specified. |
| Less than | < | GCD=<5 | Matches if the subject fingerprint's corresponding test produces a numeric value which is less than the one specified. |

FIG. 11

```
MatchPoints
SEQ(SP=30%GCD=75%ISR=30%TI=100%II=100%SS=80%TS=100)
OPS(O1=20%O2=20%O3=20%O4=20%O5=20%O6=20)
WIN(W1=15%W2=15%W3=15%W4=15%W5=15%W6=15)
ECN(R=100%DF=20%T=20%TG=20%W=15%O=15%CC=100%Q=20)
T1(R=100%DF=20%T=20%TG=20%S=20%A=20%F=30%RD=20%Q=20)
T2(R=100%DF=20%T=20%TG=20%W=25%S=20%A=20%F=30%O=10%RD=20%Q=20)
T3(R=100%DF=20%T=20%TG=20%W=25%S=20%A=20%F=30%O=10%RD=20%Q=20)
T4(R=100%DF=20%T=20%TG=20%W=25%S=20%A=20%F=30%O=10%RD=20%Q=20)
T5(R=100%DF=20%T=20%TG=20%W=25%S=20%A=20%F=30%O=10%RD=20%Q=20)
T6(R=100%DF=20%T=20%TG=20%W=25%S=20%A=20%F=30%O=10%RD=20%Q=20)
T7(R=100%DF=20%T=20%TG=20%W=25%S=20%A=20%F=30%O=10%RD=20%Q=20)
U1(R=50%DF=20%T=20%TG=20%TOS=100%IPL=100%UN=100%RIPL=100%RID=100%RIPCK=100%RUCK=100%RUL=100%RUD=100)
IE(R=50%DFI=40%T=20%TG=20%TOSI=100%CD=100%SI=100%DLI=100)
```

FIG. 13

1402
IE(R=Y%DFI=N%T=40%TOSI=S%CD=S%SI=S%DLI=S)

1404
IE(DFI=S%T=80|81%TG=81%TOSI=Z%CD=Z%SI=S%DLI=S)

1406
IE(R=50%DFI=40%T=15%TG=15%TOSI=25%CD=100%SI=100%DLI=100)

FIG. 14

DETERMINING AN ATTRIBUTE OF A TARGET COMPUTER

CROSS REFERENCE TO OTHER APPLICATIONS

This application claims priority to U.S. Provisional Patent Application No. 60/834,413 entitled REMOTE OPERATING SYSTEM DETECTION USING TCP/IP FINGERPRINTING filed Jul. 31, 2006 which is incorporated herein by reference for all purposes.

BACKGROUND OF THE INVENTION

One technique used in computer/network security auditing and administration is to attempt to find information about remote computers. For example, by sequentially sending requests to connect to the ports of a target computer, an administrator can discover which ports are listening, and what services are being offered via those ports. If the target computer is owned or managed by the administrator, this information can help the administrator confirm that only approved services are being provided, and that those services are up-to-date and not otherwise vulnerable to attacks. Tasks such as performing network inventory and monitoring the uptime of network nodes are also typically performed using scanning techniques.

In some cases, such as when an attack is being perpetrated by a remote computer against a managed node, the administrator of the managed node may attempt to learn more information about the attacking computer by performing assorted scans—for example to help stop the attack, or to document information useful to law enforcement. Unfortunately, attackers typically attempt to conceal information about their own systems to help evade detection.

Therefore, an ongoing need to be able to determine attributes of target computers exists.

BRIEF SUMMARY OF THE INVENTION

A first ICMP query is set to a first state and a second ICMP query is set to a second state. Then, the first and the second ICMP queries are sent to a target computer. Responses associated with the first and second ICMP queries that are received from the target computer are combined and used to determine an attribute of the target computer.

BRIEF DESCRIPTION OF THE DRAWINGS

Various embodiments of the invention are disclosed in the following detailed description and the accompanying drawings.

FIG. 3B is a chart illustrating the possible values of a computer attribute.

FIG. 4B is a chart illustrating the possible values of a computer attribute.

FIG. 5B is a chart illustrating the possible values of a computer attribute.

FIG. 6B is a chart illustrating the possible values of a computer attribute.

FIG. 7B is a chart illustrating the possible values of a computer attribute.

FIG. 8B is a chart illustrating the possible values of a computer attribute.

FIG. 9 illustrates an example of a subject fingerprint.

FIG. 10 illustrates an example of a reference fingerprint.

FIG. 11 is a chart illustrating an example expression syntax.

FIG. 13 illustrates an example of a set of match points.

FIG. 14 illustrates examples of portions of information used in determining the operating system of a target computer.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
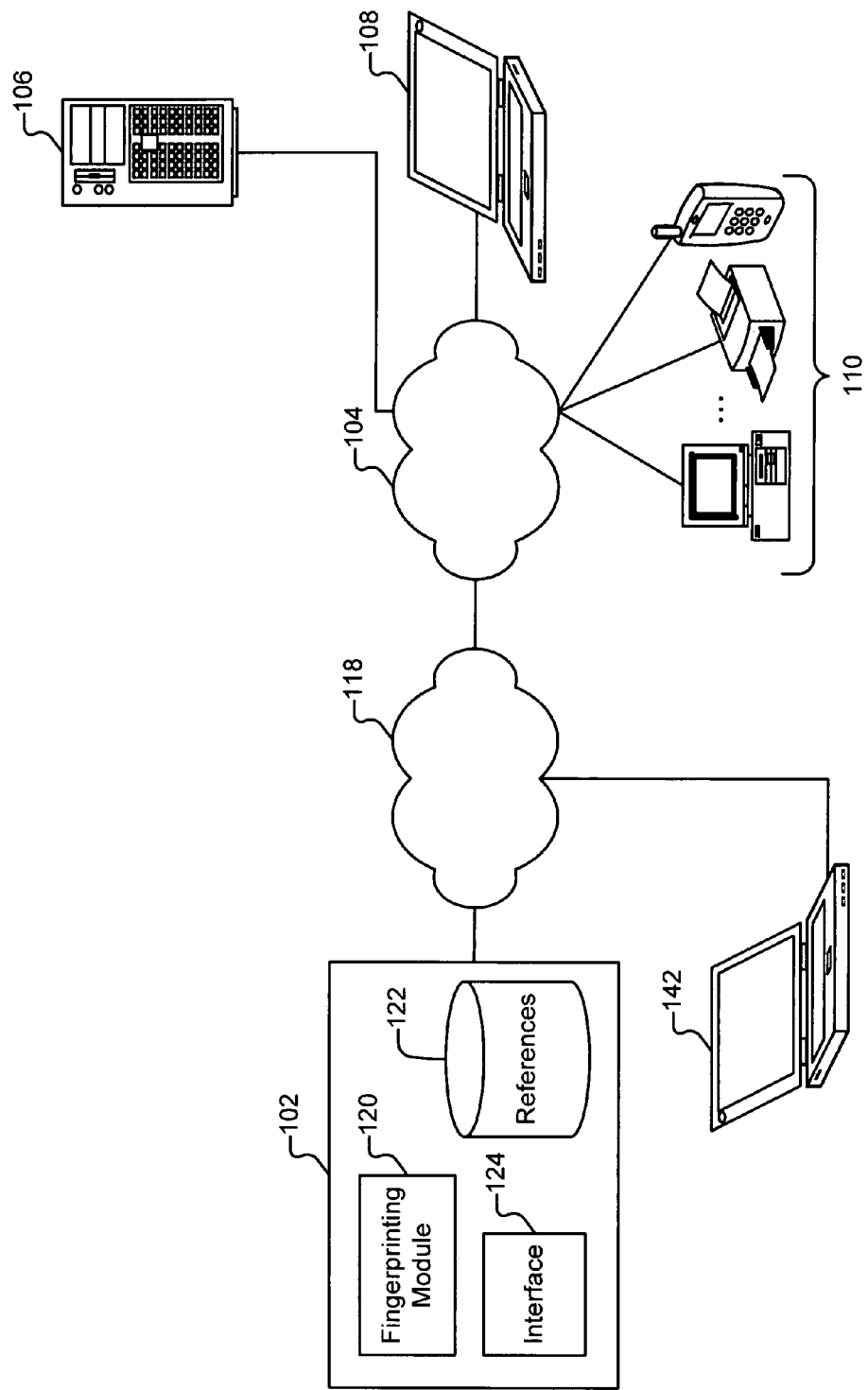
FIG. 1 is an illustration of a network environment in which attributes of target computers can be detected.

FIG. 1 is an illustration of a network environment in which attributes of target computers can be detected. In the example shown, detection system 102 includes a fingerprinting module 120, a reference database 122, and an interface 124. Detection system 102 is connected with a variety of remote computers (106-110 and 142). As used herein, a "target computer" is one against which an attribute detection attempt is being performed. Typically target computers are remote computers—ones other than the system performing the attribute detection attempt (also referred to herein as a "scan"). In some cases, (e.g., for testing purposes), the target computer may also be a localhost. Detection system 102 and node 142 are nodes in an enterprise network 118. Node 106 is a server owned by a third party, but managed by the entity that owns detection system 102. Node 108 is a computer controlled by a nefarious individual who wishes to attack node 142. Enterprise network 110 includes nodes that belong to an organization that has hired the owner of detection system 102 to perform an audit of its network. A variety of devices are members of network 110, including servers, desktop computers, laptops, networked printers, and handheld devices.

When exploring a network (e.g., for security auditing or inventory/administration), different reactions may be made to the discovery of a printer than the discovery of a router, wireless access point, telephone PBX, game console, Windows desktop, or UNIX server. The ability to detect information about the underlying operating system (OS) of a remote computer can be used in a variety of contexts. In part due to its value to attackers, many computers are configured to avoid disclosing their exact nature and operating system configuration.

One reason to attempt to determine attributes of a remote computer is to determine a node's vulnerability to specific flaws/exploits. It can sometimes be difficult to determine remotely whether an available service is susceptible or patched for a certain vulnerability. Obtaining a version number may or may not reliably answer the question, since OS distributors often backport security fixes without changing the version number. OS detection can help remove false positives. For example, the rwho daemon on unpatched Sun Solaris 7 through 9 may be remotely exploitable. If it can be determined that a target system is running Solaris 10, the vulnerability can be ruled out.

Administrative reasons may also exist for determining attributes of a remote computer. Before renewing support contracts for particular hardware for another year, a scan can be performed to determine whether anyone still uses machines covered by the support contract. An inventory can also be useful for IT budgeting and ensuring that all company equipment is accounted for.

Another reason to determine attributes of a remote computer is to detect unauthorized and dangerous devices. With the ubiquity of mobile devices and inexpensive commodity networking equipment, companies are increasingly finding that employees are extending their networks in undesirable ways. An employee may install a $20 wireless access point in their cubical without realizing (or caring) that they just opened up the protected corporate network to potential attackers in the parking lot or nearby buildings. Connecting insecure and/or worm-infected laptops to the corporate network can lead to similar problems.

As described in more detail below, reference database 122 includes heuristics for identifying different systems based on how they respond to a selection of TCP/IP probes. Fingerprinting module 120 crafts and sends the probes, and evaluates the responses to construct a "fingerprint" enumerating the detected attributes of the target computer. Detection system 102 is also configured to interrogate open TCP or UDP ports to determine device type and OS details. In some embodiments, results of these two techniques are reported independently so that combinations such as a Checkpoint firewall forwarding port 80 to a Windows IIS server can be detected.

In various embodiments, detection system 102 is configured to examine remote computers via one or more of a variety of public and/or private networks, including a SAN, LAN, WAN, or combination thereof.

In the example shown in FIG. 1, the components of detection system 102 are collocated on a single platform. In various embodiments, portions of detection system 102 may be provided across multiple platforms. For example, fingerprinting module 120 may be located on a handheld device in communication with, but physically separate from reference database 122. The functionality provided by reference database 122 may also be distributed across multiple platforms. In some embodiments, whenever detection system 102 performs a task (such as communicating with a remote computer or accessing information in a database), either a single component or a subset of components or all components of detection system 102 may cooperate to perform the task. For example, interface 124 is an optional component configured to communicate with a user of detection system 102. Similarly, in some embodiments portions of detection system 102 (such as reference database 122 or some/all of its contents) are provided by one or more third parties.

ICMP Queries

Figure 2:
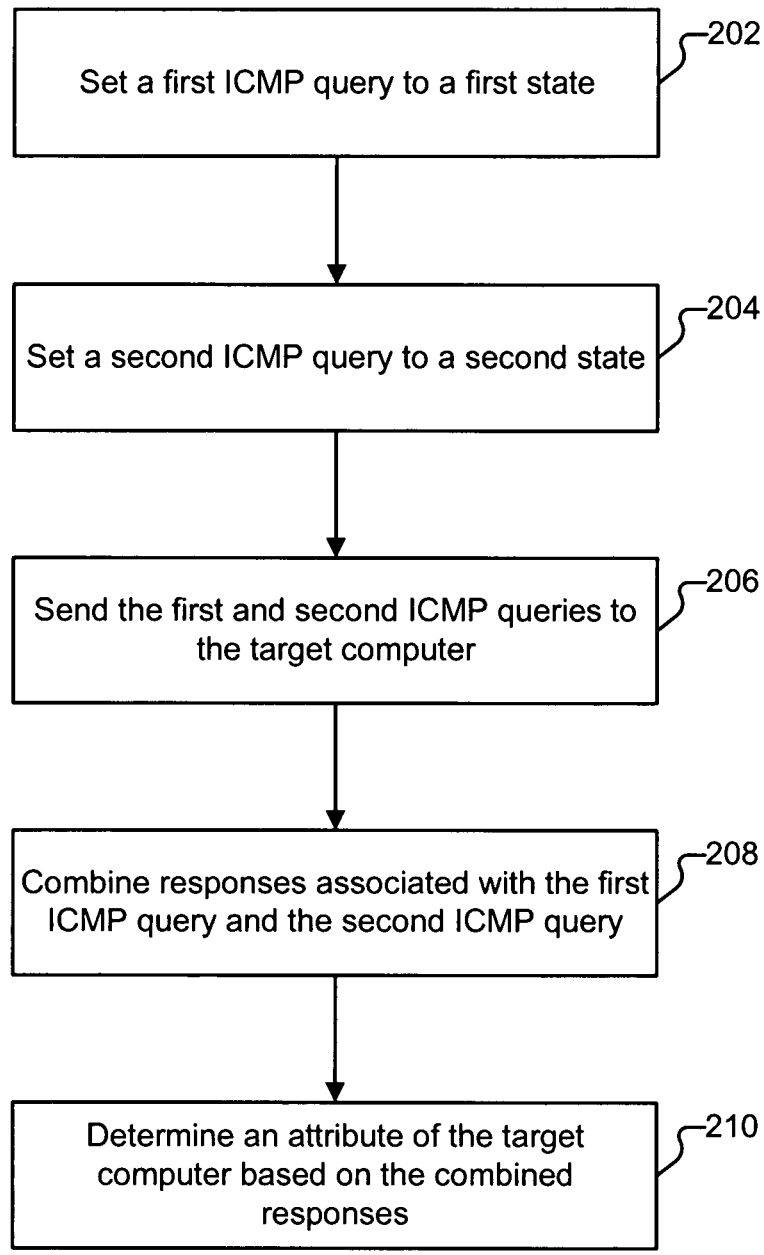
FIG. 2 illustrates an example of a process for determining an attribute of a target computer.

FIG. 2 illustrates an example of a process for determining an attribute of a target computer. In some embodiments the process shown in FIG. 2 is performed by detection system 102. In the example shown, the process begins at 202 when an ICMP query (e.g., an ICMP information request, ICMP echo request, ICMP timestamp request, ICMP address mask request, or other request) (also referred to herein as an ICMP "probe") is configured to a first state. As described in more detail below, the probes can be configured to exploit various ambiguities in standard protocol RFCs. For example, assorted packet header fields and flags may be set or otherwise manipulated at 202.

At 204, a second probe is configured to a second state. For example, an option set at 202 in the first ICMP query is not set at 204 in the second ICMP query. In some cases, the first and second state are the same, as described in more detail below.

At 206, the first and second ICMP queries are sent to the target computer. In some embodiments, probes are configured at the time of transmission, and portions of 202-206 of the process shown in FIG. 2 are combined or eliminated, as applicable. One example of how the processing of FIG. 2 can be initiated is by a user entering a command such as "detect-os [IP address or ranges of addresses]" via interface 124.

Responses are listened for. When received, attributes of those responses are analyzed and combined at 208.

At 210, an attribute of the target computer is determined based on the combined responses. Suppose a particular operating system responds to a particular option being set in a probe by echoing that option back in a response. At 202, the option is set in a first probe, and at 204, the option is not set in a second probe. The first and second ICMP queries are sent at 206, and responses are received. At 208, the responses are compared against the information originally provided in the first and second probes. Suppose it is determined that the response to the first ICMP query includes the option, and the response to the second ICMP query does not. At 210 it is determined that an attribute of the target computer is that it echoes the option. In various embodiments, probe packets are tracked and resent at least once if there no response is received.

As described in more detail below, the process shown in FIG. 2 can be used to simultaneously detect a variety of attributes of a target computer. For example, the ICMP query crafted at 202 may include the IP DON'T FRAGMENT bit set, a TYPE OF SERVICE byte value of 0, a CODE of 9, the sequence number 295, a random IP ID and ICMP request identifier, and a random character repeated 120 times for the data payload. The query crafted at 204 may include an unset IP DON'T FRAGMENT bit, a TYPE OF SERVICE byte value of 4, a CODE of 0, and 150 bytes of data, with each of the IP ID, request ID, and sequence numbers incremented by one. In some embodiments, the processing of FIG. 2 is performed multiple times.

A "fingerprint" of the target computer that identifies the target computer's detected attributes can be generated and, as described in more detail below, compared against information stored in reference database 122 to determine which operating system (or likely candidate operating systems) the target computer is running.

Figure 3A:
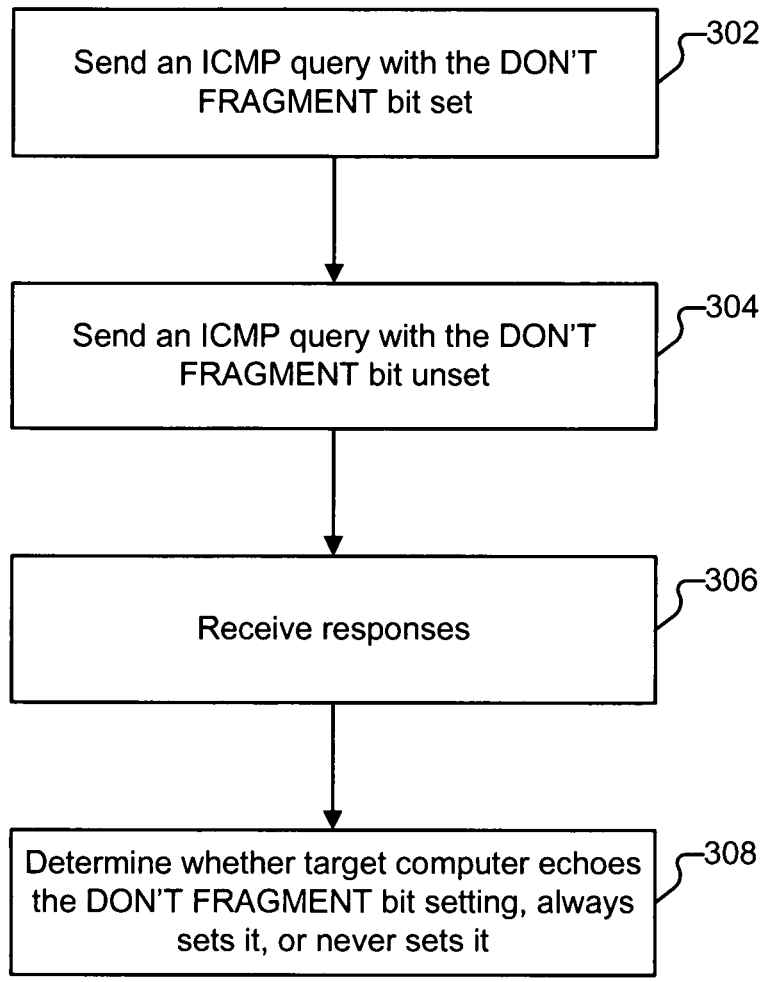
FIG. 3A illustrates an example of a process for determining an attribute of a target computer.

FIG. 3A illustrates an example of a process for determining an attribute of a target computer. In some embodiments the process shown in FIG. 3A is performed by detection system 102. In the example shown, the process begins at 302 when an ICMP query is configured to include a set DON'T FRAGMENT bit, and sent to a target computer. At 304, an ICMP query is configured to include an unset DON'T FRAGMENT bit, and sent to the target computer. In some embodiments the ICMP queries are ICMP echo requests. At 306, responses to the ICMP queries are received from the target computer. At 308, the responses are evaluated.

FIG. 3B is a chart illustrating the possible values of a computer attribute. In some embodiments the information included in the chart shown in FIG. 3B is used in the evaluation performed at 308 of the process shown in FIG. 3A. If neither of the responses have the DON'T FRAGMENT bit set (352), the target computer has the attribute that it never sets a DON'T FRAGMENT bit. In some embodiments this information is represented in the relevant portion of the target computer's fingerprint as IE(DF=N).

If the response to the ICMP query sent at 302 has the DON'T FRAGMENT bit set, and the response to the ICMP query sent at 304 does not (354), the target computer has the attribute that it echoes the DON'T FRAGMENT bit setting. In some embodiments this information is represented in the relevant portion of the target computer's fingerprint as IE(DF=S).

If both of the responses have the DON'T FRAGMENT bit set (356), the target computer has the attribute that it always sets a DON'T FRAGMENT bit. In some embodiments this information is represented in the relevant portion of the target computer's fingerprint as IE(DF=Y).

If the responses include DON'T FRAGMENT bit settings that are opposite those that were sent (358), the target computer has the attribute that it inverts the setting. In some embodiments this information is represented in the relevant portion of the target computer's fingerprint as IE(DF=O).

Figure 4A:
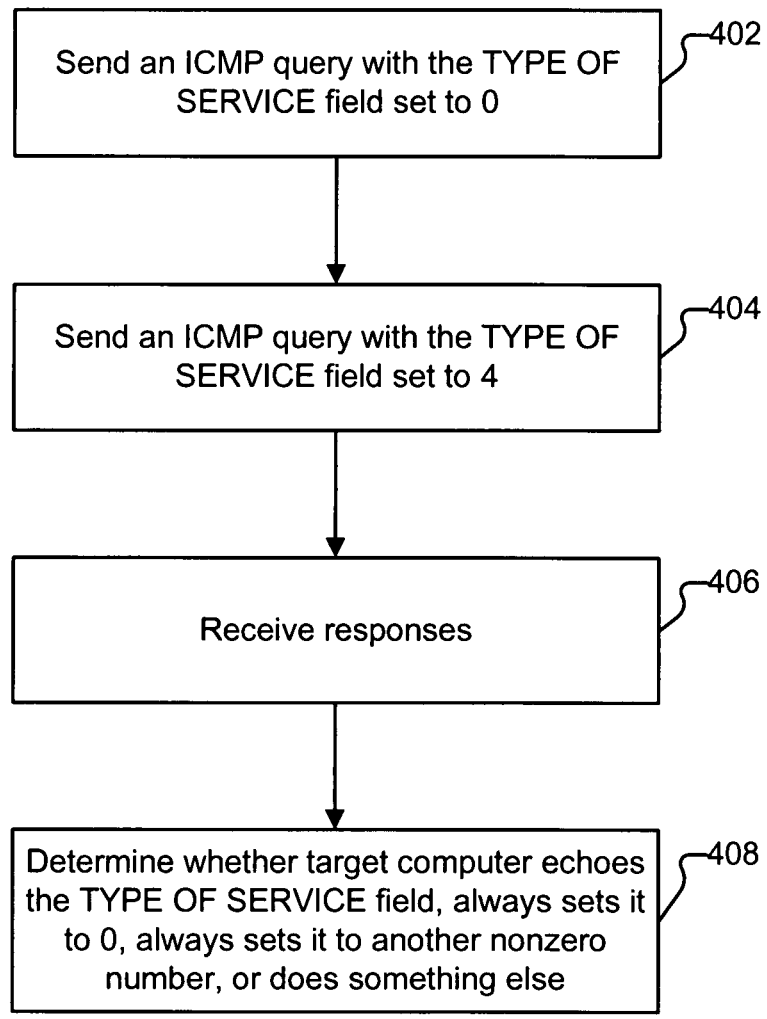
FIG. 4A illustrates an example of a process for determining an attribute of a target computer.

FIG. 4A illustrates an example of a process for determining an attribute of a target computer. In some embodiments the process shown in FIG. 4A is performed by detection system 102. In the example shown, the process begins at 402 when an ICMP query is configured with a value of zero in the TYPE OF SERVICE field, and sent to a target computer. At 404, an ICMP query is configured with a value of four (or another selected non-zero value) in the TYPE OF SERVICE field, and sent to the target computer. In some embodiments the ICMP queries are ICMP echo requests. At 406, responses to the ICMP queries are received from the target computer. At 408, the responses are evaluated.

FIG. 4B is a chart illustrating the possible values of a computer attribute. In some embodiments the information included in the chart shown in FIG. 4B is used in the evaluation performed at 408 of FIG. 4A. If both received responses have a zero in the TYPE OF SERVICE field (452), the target computer has the attribute that it always sets the TYPE OF SERVICE field to zero. In some embodiments this information is represented in the relevant portion of the target computer's fingerprint as IE(TOSI=Z).

If the response to the ICMP query sent at 402 has a zero in the TYPE OF SERVICE field and the response to the ICMP query sent at 404 has a four in the TYPE OF SERVICE field (454), the target computer has the attribute that it echoes the TYPE OF SERVICE field. In some embodiments this information is represented in the relevant portion of the target computer's fingerprint as IE(TOSI=S).

If the responses both include an identical, non-zero value in the TYPE OF SERVICE field (456), the target computer has the attribute that it always sets the value of the TYPE OF SERVICE field to the same non-zero value. In some embodiments this information is represented in the relevant portion of the target computer's fingerprint as IE(TOSI=[the number]).

If the responses include any other combination of values for the TYPE OF SERVICE field (458), this attribute is determined to have an "other" value, represented in some embodiments in the relevant portion of the target computer's fingerprint as IE(TOSI=O).

Figure 5A:
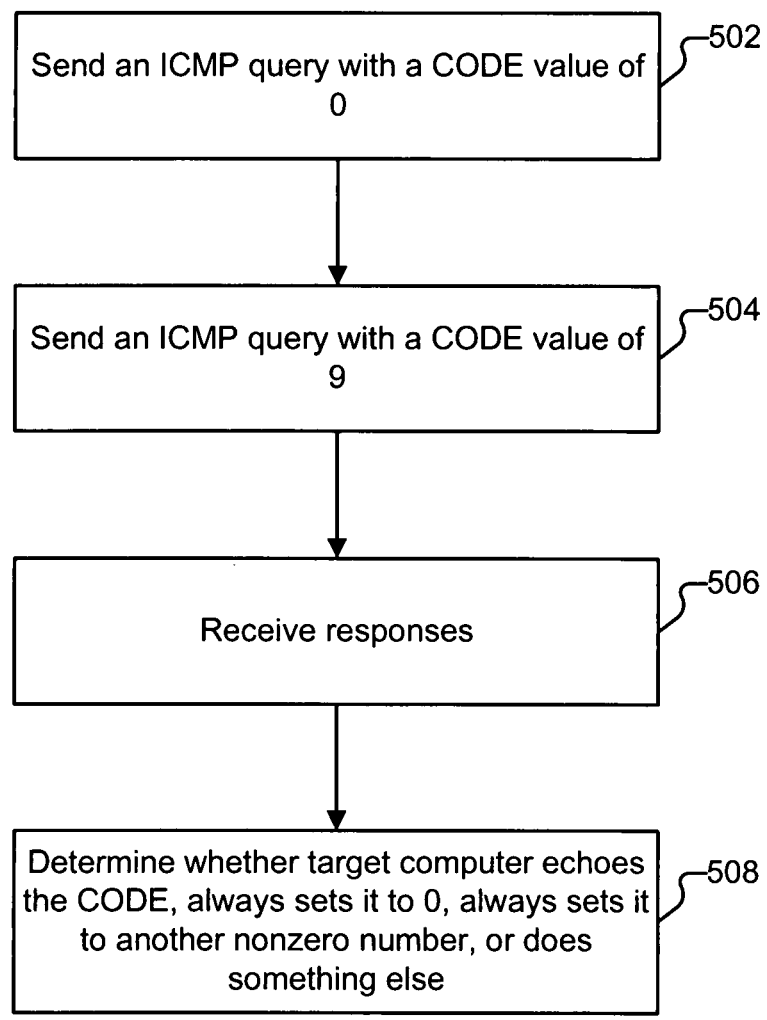
FIG. 5A illustrates an example of a process for determining an attribute of a target computer.

FIG. 5A illustrates an example of a process for determining an attribute of a target computer. In some embodiments the process shown in FIG. 5A is performed by detection system 102. In the example shown, the process begins at 502 when an ICMP query is configured with a code value of zero and sent to a target computer. At 504, an ICMP query is configured with a code value of nine (or another selected non-zero value) and sent to the target computer. In some embodiments the ICMP queries are ICMP echo requests. At 506, responses to the ICMP queries are received from the target computer. At 508, the responses are evaluated.

FIG. 5B is a chart illustrating the possible values of a computer attribute. In some embodiments the information included in the chart shown in FIG. 5B is used in the evaluation performed at 508 of FIG. 5A. If both received responses have a CODE value of zero (552), the target computer has the attribute that it always sets the CODE to zero. In some embodiments this information is represented in the relevant portion of the target computer's fingerprint as IE(CD=Z).

If the response to the ICMP query sent at 502 has a CODE value of zero and the response to the ICMP query sent at 504 has a CODE value of nine (554), the target computer has the attribute that it echoes the CODE. In some embodiments this information is represented in the relevant portion of the target computer's fingerprint as IE(CD=S).

If the responses both include an identical, non-zero CODE value (556), the target computer has the attribute that it always sets the CODE to the same non-zero value. In some embodiments this information is represented in the relevant portion of the target computer's fingerprint as IE(CD=[the number]).

If the responses include any other combination of CODE values (558), this attribute is determined to have an "other" value, represented in some embodiments in the relevant portion of the target computer's fingerprint as IE(CD=O).

Figure 6A:
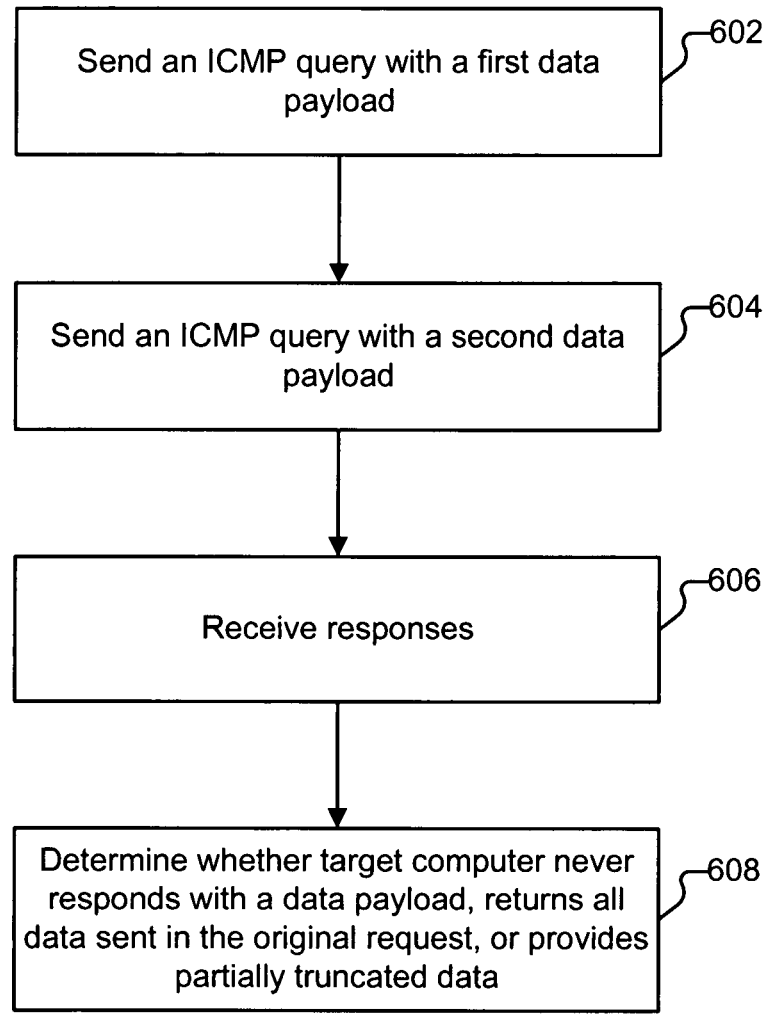
FIG. 6A illustrates an example of a process for determining an attribute of a target computer.

FIG. 6A illustrates an example of a process for determining an attribute of a target computer. In some embodiments the process shown in FIG. 6A is performed by detection system 102. In the example shown, the process begins at 602 when an ICMP query is configured to include a random character repeated 120 times (or some other data) as a data payload and sent to a target computer. At 604, an ICMP query is configured to include a random character repeated 150 times (or some other data, different from that used at 602) as a data payload and sent to the target computer. In some embodiments the ICMP queries are ICMP echo requests. At 606, responses to the ICMP queries are received from the target computer. At 608, the responses are evaluated.

FIG. 6B is a chart illustrating the possible values of a computer attribute. In some embodiments the information included in the chart shown in FIG. 6B is used in the evaluation performed at 608 of FIG. 6A. If neither received responses include any data (652), the target computer has the attribute that it never returns the data included in the request. In some embodiments this information is represented in the relevant portion of the target computer's fingerprint as IE(DLI=Z).

If the responses both include all data sent in the respective ICMP queries (i.e., sent at 602 and 604) (654), the target computer has the attribute that it echoes the data payload. In some embodiments this information is represented in the relevant portion of the target computer's fingerprint as IE(DLI=S).

If at least one of the received responses truncates the data (656), the target computer has the attribute that it truncates, but does not omit, the data payload. In some embodiments this information is represented in the relevant portion of the target computer's fingerprint as follows. If at least one of the responses truncates the data, but the data length of the two responses is different, the largest amount of data returned (in either packet) is used as "the number" in the representation, IE(DLI=[the number]). If both responses truncate the data length to the same non-zero number, that number is used as "the number" instead. In some embodiments the number counts actual data, not the IP or ICMP headers.

Figure 7A:
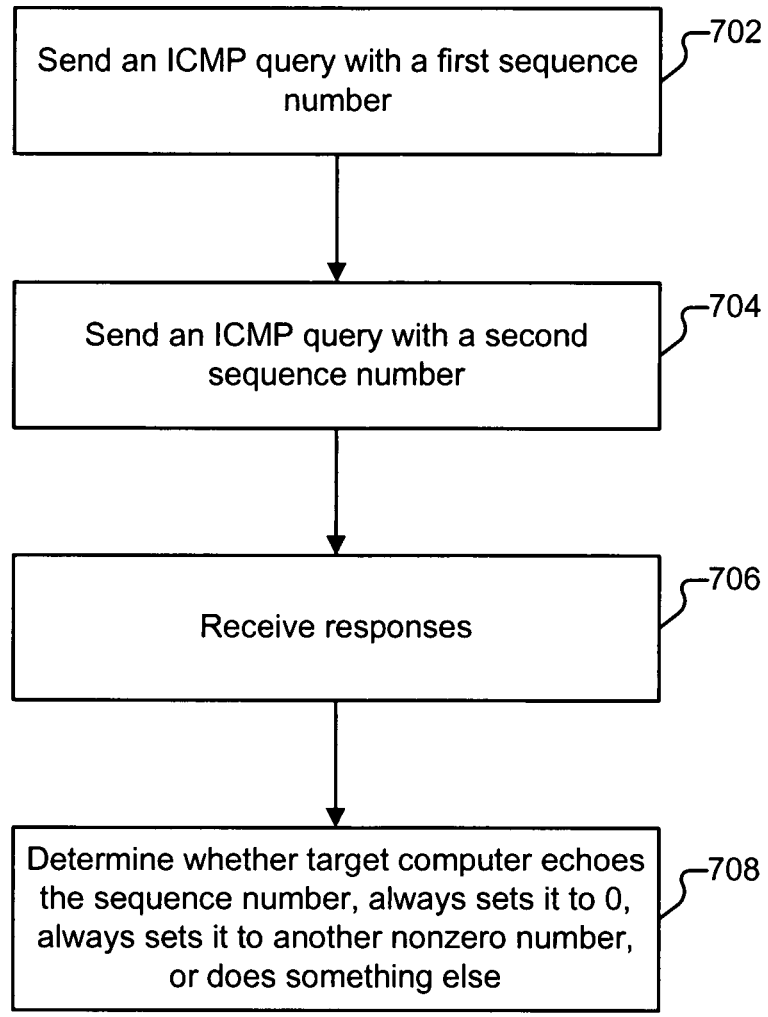
FIG. 7A illustrates an example of a process for determining an attribute of a target computer.

FIG. 7A illustrates an example of a process for determining an attribute of a target computer. In some embodiments the process shown in FIG. 7A is performed by detection system 102. In the example shown, the process begins at 702 when an ICMP query is configured with a first sequence number and sent to a target computer. At 704, a second ICMP query is configured with a second sequence number and sent to the target computer. In some embodiments the ICMP queries are ICMP echo requests. At 706, responses to the ICMP queries are received from the target computer. At 708, the responses are evaluated.

In some embodiments a single ICMP query is sent (e.g., at 702) and the second ICMP query (e.g. sent at 704) is omitted. In that case, the technique for determining the remote computer's attribute at 708 is modified, accordingly.

FIG. 7B is a chart illustrating the possible values of a computer attribute. In some embodiments the information included in the chart shown in FIG. 7B is used in the evaluation performed at 708 of FIG. 7A. If both received responses have an ICMP sequence number of zero (752), the target computer has the attribute that it always sets the sequence number to zero. In some embodiments this information is represented in the relevant portion of the target computer's fingerprint as IE(SI=Z).

If the response to the ICMP query sent at 702 has an ICMP sequence number matching the first sequence number and the response to the ICMP query sent at 704 has an ICMP sequence number matching the second sequence number (754), the target computer has the attribute that it echoes the sequence number. In some embodiments this information is represented in the relevant portion of the target computer's fingerprint as IE(SI=S).

If the responses both include an identical, non-zero ICMP sequence number (756), the target computer has the attribute that it always sets the sequence number to the same non-zero value. In some embodiments this information is represented in the relevant portion of the target computer's fingerprint as IE(SI=[the number]).

If the responses include any other ICMP sequence number values (758), this attribute is determined to have an "other" value, represented in some embodiments in the relevant portion of the target computer's fingerprint as IE(SI=O).

IP Initial Time-to-Live (T)

IP packets contain a field named time-to-live (TTL) which is decremented every time a router is traversed. If the field reaches zero, the packet must be discarded, preventing packets from looping endlessly. Because operating systems differ on which TTL they start with, this information can be used for OS detection. In some embodiments detection system 102 determines how many hops away it is from the target computer by examining the ICMP port unreachable response to a UDP packet sent to a closed port (hereinafter "the UDP probe"). In some embodiments, in the UDP probe, the character 'C' (0x43) is repeated 300 times for the data field and the IP ID value is set to 0x1042. The received ICMP port unreachable response includes the original IP packet, including the already-decremented TTL field, received by the target. By subtracting that value from the as-sent TTL, the number of hops away the target is can be learned. Detection system 102 is configured to add that hop distance to the probe response TTL to determine what the initial TTL was when that ICMP probe response packet was sent. In some embodiments the initial TTL value is included in the fingerprint. Other techniques may also be used to generate ICMP error messages, instead of or in addition to the UDP probe described above.

In some situations, this test can result in values of 0x100 or higher, despite the fact that an 8-bit field (like TTL) cannot hold values greater than 0xFF. One reason this may occur is if a system (whether the source, a target, or a system in between) corrupts or otherwise fails to correctly decrement the TTL. It can also occur due to asynchronous routes.

Detection system 102 can also learn from system interface and routing tables when the hop distance is 0 (a localhost scan) or 1 (on the same network segment). In some embodiments, this value is used when detection system 102 provides information to a user (e.g., via interface 124), but it is not used for fingerprinting.

IP Initial Time-to-Live Guess (TG)

In some cases detection system 102 may not receive responses to the UDP probe described above and is thus unable to use the technique described above to determine an initial TTL. For example, firewalls and NAT devices frequently block unsolicited UDP packets. Nonetheless, since common TTL values are spread well apart and targets are rarely more than 20 hops away, detection system 102 can make an educated guess at the initial TTL. Most systems send packets with an initial TTL of 32, 60, 64, 128, or 255. In some embodiments detection system 102 is configured to round the TTL value received in the response to the next value out of the group including 32, [60], 64, 128, and 255. In some embodiments 60 is not included in the list because it cannot be reliably distinguished from 64, and is used less frequently than 64. In some embodiments the resulting guess is included in the fingerprint. In some embodiments, the TTL guess field is not printed in a fingerprint if the actual TTL value was discovered.

ICMP IP ID Sequence Generation (II)

Figure 8A:
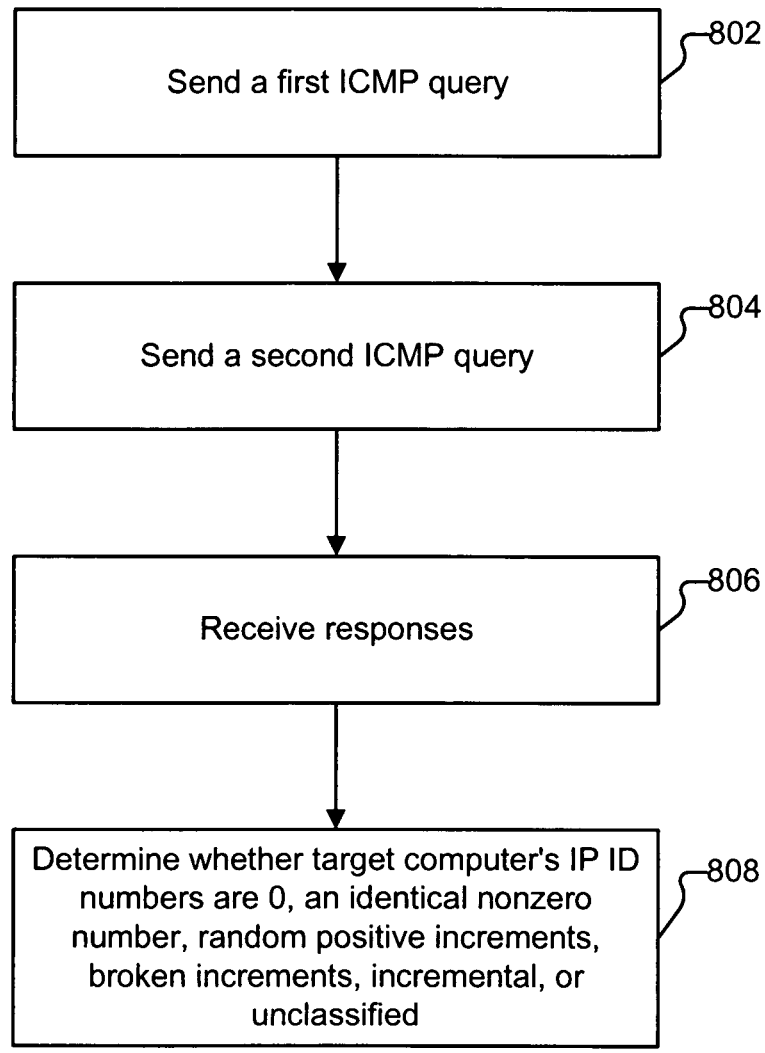
FIG. 8A illustrates an example of a process for determining an attribute of a target computer.

FIG. 8A illustrates an example of a process for determining an attribute of a target computer. In some embodiments the process shown in FIG. 8A is performed by detection system 102. In the example shown, the process begins at 802 when a first ICMP query is configured and sent to a target computer. At 804, a second ICMP query is configured and also sent to the target computer. In some embodiments the ICMP queries are ICMP echo requests. At 806, responses to the ICMP queries are received from the target computer. At 808, the responses are evaluated.

In some embodiments other types of IP packets (such as TCP or UDP probes) are sent (e.g., at 802 and 804) instead of or in addition to ICMP queries. Such probes nonetheless elicit ICMP responses from the target computer and the rest of the process continues as shown.

FIG. 8B is a chart illustrating the possible values of a computer attribute. In some embodiments the information included in the chart shown in FIG. 8B is used in the evaluation performed at 808 of FIG. 8A. If both received responses have an IP ID number of zero (852), the target computer has the attribute that it always sets the sequence number to zero. In some embodiments this information is represented in the relevant portion of the target computer's fingerprint as IE(II=Z).

If the responses both include an identical, non-zero IP ID number (854), the target computer has the attribute that it always sets the sequence number to the same non-zero value. In some embodiments this information is represented in the relevant portion of the target computer's fingerprint as IE(II=[the number]).

If the absolute difference in IPID numbers in the two responses exceeds 1,000 and is not evenly divisible by 256, the target has the attribute that it increases its IP ID numbers by a positive random number (856). If the IPID difference is evenly divisible by 256, the difference must be at least 256,000 to trigger this attribute. In some embodiments this information is represented in the relevant portion of the target computer's fingerprint as IE(II=RI).

If the absolute difference in IPID numbers in the two responses is divisible by 256 and no greater than 5,120, the target has the attribute that it increases its IP ID numbers in host byte order rather than network byte order (858). In some embodiments this information is represented in the relevant portion of the target computer's fingerprint as IE(II=BI).

If the absolute difference in IPID numbers in the two responses is less than 10, the target has the attribute that it simply increments its IP ID number by increasing them one at a time (860). In some embodiments this information is represented in the relevant portion of the target computer's fingerprint as IE(II=I).

If none of these classifications match the observed responses, the IP ID generation behavior is considered unclassified. In some embodiments no attribute may be recorded.

Shared IP ID Sequence Boolean (SS)

The Shared IP ID Sequence Boolean records (e.g. in the fingerprint) whether the target computer shares its IP ID sequence between the TCP and ICMP protocols. As described in more detail below, detection system 102 is configured in some embodiments to send various TCP probes to a target computer. Suppose six TCP responses are received from the target computer (e.g., in response to six TCP probes), and have IP ID values of 117, 118, 119, 120, 121, and 122, respectively, and suppose that two ICMP responses are numbered 123 and 124, respectively. In that circumstance, both sequences are incremental, and are both part of the same sequence. If, on the other hand, the TCP IP ID values are 117-122 but the ICMP values are 32,917 and 32,918, a different sequence is being used for the two protocols.

In some embodiments detection system 102 is configured to determine the Shared IP ID Sequence Boolean if the "II" value described above is "RI," "BI," or "I" as does a similar "TI" value tracking the generation of TCP IP IDs. Using this test, if the IP ID sequence is shared, the result an "SS" value is set to "S" in the fingerprint, and if the sequence is not shared, "SS" has a value of "O" (other). In some embodiments the following technique is used to determine the Boolean value:

Let "avg" be the final TCP sequence response IP ID minus the first TCP sequence response IP ID, divided by the difference in probe numbers. If the first probe returns an IP ID of 10,000 and the sixth probe returns an IP ID of 20,000, "avg" would be (20,000−10,000)/(6−1), which equals 2,000. If the first ICMP echo response IP ID is less than the final TCP sequence response IP ID plus three times "avg," the "SS" result is "S." Otherwise, it is "O."

TCP ISN Counter Rate (ISR)

This value reports the average rate of increase for a returned TCP initial sequence number (ISN). In some embodiments detection system 102 is configured to determine the attribute as follows. First, an array of differences between probe responses is created (referred to herein as the "difference array"). The first element is the difference between the ISNs of the first and second probe responses. The second element is the difference between the ISNs of the second and third probe responses. Thus, if responses to the six TCP probes are all received, five elements will be computed.

Next, a difference is taken between each two consecutive elements of the difference array. Those differences are each divided by the amount of time (e.g., in seconds) elapsed between sending the two probes which generated them. The result is another array containing the rates of ISN counter increases per second. This array has one element for each consecutive pair of values in the difference array. An average is taken of the array values. If that average is less than one (e.g. a constant ISN is used), the "ISR" attribute is zero. Otherwise, the "ISR" is eight times the binary logarithm of that average value, rounded to the nearest integer.

TCP Probes

In various embodiments, detection system 102 is configured to send a variety of TCP probes to a target computer, manipulating header fields including flags, sequence and acknowledgement numbers, TCP options, and window size. For example, detection system 102 can be configured to send six TCP probes to assist in the determination of the Shared IP ID Sequence Boolean described above. Additional examples of TCP probes include a TCP explicit congestion notification (ECN) test, and six tests entitled T2 through T7, respectively, which each send one TCP probe packet.

The TCP options (and window size) of each of the thirteen TCP probes can be used to determine attributes of a target computer. RFC 793 does not require any ordering of TCP options. Thus, different operating systems typically use different orderings. Some platforms don't implement all options. The responses provided by a target computer to TCP probes sent by detection system 102 can thus be used to determine attributes of the target computer. Examples of TCP options that detection system 102 can be configured to use include window scale, no operation (NOP), maximum segment size (MSS), Timestamp, and selective acknowledgement permitted (SACK permitted). The window size is a TCP header value rather than an option, but is used in a manner similar to the TCP options.

The ECN test is used to determine support for explicit congestion notification (ECN) in the target computer's TCP stack. One way to test for ECN support is by sending a SYN packet which has the ECN, Congestion Window Reduced (CWR), and ECN-Echo (ECE) congestion control flags set. The acknowledgment number is 0, the sequence number is random, the window size field is 3, and the reserved bit which immediately precedes the CWR bit is set. The TCP options used are in the ECN test are: window scale (10), NOP, MSS (1460), SACK permitted, NOP, NOP. The probe is sent to an open port.

In some embodiments tests T2 through T7 are performed as follows. The TCP options data in each of T2 through T6 is (in hexadecimal) 03030A0102040109080AFFFFFFFF000000000402. Those 20 bytes correspond to window scale (10), NOP, MSS (265), Timestamp (TSval: 0xFFFFFF; TSecr: 0), SACK permitted. The T7 test uses the above configuration, with the exception of the window scale which is set to 15, rather than 10. The variable characteristics of each probe are described below:

T2 sends a TCP NULL (no flags set) packet with the IP DF bit set and a window size field of 128 to an open port.

T3 sends a TCP packet with the SYN, FIN, URG, and PSH flags set and a window size field of 256 to an open port. The IP DF bit is not set.

T4 sends a TCP ACK packet with IP DF and a window size field of 1024 to an open port.

T5 sends a TCP SYN packet without IP DF and a window size field of 31337 to a closed port.

T6 sends a TCP ACK packet with IP DF and a window size field of 32768 to a closed port.

T7 sends a TCP packet with the FIN, PSH, and URG flags set and a window size field of 65535 to a closed port. The IP DF bit is not set.

In some embodiments, TCP probes (e.g., such as are used in determining a Shared IP ID Sequence Boolean) are configured with the following TCP options.

One packet has: window scale (10), NOP, MSS (1460), Timestamp (TSval: 0xFFFFFF; TSecr: 0), SACK permitted. The window size field is 1.

Another packet has: MSS (1400), window scale (0), SACK permitted, Timestamp (TSval: 0xFFFFFF; TSecr: 0). The window size field is 63.

Another packet has: Timestamp (TSval: 0xFFFFFF; TSecr: 0), NOP, NOP, window scale (5), NOP, MSS (640). The window size field is 4.

Another packet has: SACK permitted, Timestamp (TSval: 0xFFFFFF; TSecr: 0), window scale (10). The window size field is 4.

Another packet has: MSS (536), SACK permitted, Timestamp (TSval: 0xFFFFFF; TSecr: 0), window scale (10). The window size field is 16.

The remaining packet has: MSS (265), SACK permitted, Timestamp (TSval: 0xFFFFFF; TSecr: 0). The window size field is 512.

The above mentioned TCP probes are examples and can be modified and the techniques described herein adapted accordingly. For example, NOPs may be added or deleted. Different Timestamp values may also be used.

Since TCP options are optional, systems can often be distinguished by the subset of available options which they support. The ordering of option values in a response is also system dependent. And, the values used in maximum segment size, window scale, and timestamp options are also attributes which can serve to distinguish operating systems. Responses to the TCP probes described above can thus provide a variety of information about a target computer's configuration.

Fingerprints

FIG. 9 illustrates an example of a subject fingerprint. In some embodiments the fingerprint shown is generated by detection system 102, and is stored in memory as a tree of attributes and values. A user may view a visual representation of the fingerprint via interface 124 if desired.

Fingerprints of known operating systems (e.g., ones that are stored in reference database 122) are referred to herein as reference fingerprints, while the fingerprint that is produced by detection system 102 after scanning a target computer is referred to herein as a subject fingerprint.

Reference fingerprints are typically more complex than subject fingerprints because they can be tailored (e.g. using an expression syntax) to match one or more classes or other groups of operating systems. More leeway can also be given to tests that are less pertinent to detecting that particular operating system, and tests can also stringently require specific values (or even a single value). Reference fingerprints also typically include OS details and classifications.

The fingerprint shown in FIG. 9 is an example of a subject fingerprint. Each line is a category of tests. For example, "SEQ" indicates the battery of sequence generation tests, and "IE" indicates tests related to ICMP probes.

Following each test name is a pair of parenthesis which enclose results for individual tests. The tests take the format testname=value and pairs of tests are separated by a percentage symbol (%). Test values can be empty, leading to a percentage symbol or category-terminating right-parenthesis immediately following the equal sign. The string O=% RD=0% Q=) in T4 of the example shown in FIG. 9 shows two of these empty tests.

In some cases, a whole test may be missing rather than just its value. For example, in FIG. 9 T2 does not include W (TCP window), S (sequence number), A (acknowledgment number), T (TTL), or TG (TTL guess). In this case, the one test and value it does include, R=N, means that no response was returned for the T2 probe, precluding the performance of those other tests. Similarly, tests which are not well supported on the platform providing detection system 102 are also skipped. For example, determining information based on the IP ID field returned in an ICMP packet may not work if detection system 102 runs Solaris due to corruption of the ID field. In some embodiments, tests which are inconclusive (such as failing to detect the IP ID sequence for the IP ID test) are also omitted.

SCAN line 902 is a special case in a subject fingerprint. Rather than describe the target system, these tests describe various conditions of the scan and are used to integrate new fingerprints into reference database 122. The SCAN tests include: a Version number (V); the Date of scan (D) in the form month/day; Open and Closed TCP ports (on the target computer) used for scanning (OT and CT) in decimal format (if no open or closed port is found, in some embodiments the test is included with an empty value); Closed UDP port (CU); Private IP space (PV), which is Y if the target is on the 10.0.0.0/8, 172.16.0.0/12, or 192.168.0.0/16 networks and is otherwise N; Network distance (DS), which is the network hop distance from the target; Good results (G) is Y if conditions and results are good enough to submit this fingerprint to include in reference database 122 and N otherwise; Target MAC prefix (M), which is the first six hexadecimal digits of the target MAC address, which correspond to the vendor name; the OS scan time (TM) provided in UNIX time_t format (in hexadecimal); and the Platform (P) used to provide the functionality of system 102.

As described in more detail below, when detection system 102 scans a target to determine its attributes and create a subject fingerprint, it then tries to match that subject fingerprint data against the reference fingerprints in reference database 122. In addition to the information generally included in a target fingerprint, reference fingerprints may also include extra information to facilitate matching and to describe the operating systems that they represent.

FIG. 10 illustrates an example of a reference fingerprint. In some embodiments such fingerprints are stored in reference database 122. In the example shown, the SCAN line (present in the example shown in FIG. 9) is not present, since that information describes a specific scan instance rather than general target OS characteristics. Lines 1002 and 1004 provide a description of the operating system described by the attributes included in the fingerprint shown in FIG. 10. Information such as vendor, product name, and version number (or ranges of version numbers) are typically included in lines 1002 and 1004, and are described in more detail below. Additionally, test results are enhanced with expressions where appropriate (e.g. on line 1006), as described in more detail below.

In some cases, the same operating system release may fingerprint differently based on factors such as what network drivers are used, user-configurable options, patch levels, processor architecture, amount of RAM available, firewall settings, etc. For minor variations, an expression syntax can be used, e.g., to allow for a range of values that indicate the same operating system. The expression syntax is described in more detail below. For major variations (e.g., XYZ operating system with drivers provided by ABC vendor vs. DEF vendor), multiple fingerprints for the same operating system can also be used.

In some cases, different operating systems may have the same resulting fingerprint. If two (or more) systems give the exact same results for every test, in some embodiments detection system 102 presents both (all) as possibilities, e.g. via interface 124. In some cases this situation occurs where vendors release new versions of their operating system without having made any significant changes to the IP stack. Important changes may have been made elsewhere, or the upgrades may have been superficial. In such circumstances, detection system 102 can be configured to prints a range of applicable operating system versions such as Sun Solaris 9-10.

Duplicate fingerprints may also occur for different devices which share a common operating system. For example, a printer from one vendor and an Ethernet switch from another may actually share an embedded OS from a third vendor. Subtle differences between the devices may still allow them to be distinguished. Nonetheless, detection system 102 may also be configured to list the possibilities.

Multiple vendors may sometimes label the same OEM device with their own brand name and model number. Detection system 102 can be configured to list the possibilities, and also to indicate that the other possibilities are all fundamentally the same device.

In some embodiments reference database 122 is configured to allow the submission/retrieval of comments that provide more detailed information.

In some cases, detection system 102 is used by human users, such as ones interacting with detection system 102 via interface 124. The processing provided by detection system 102 can also be used in conjunction with scripts and applications, such as to perform periodic security scans or to generate reports.

Every fingerprint has one or more Class lines (e.g., line 1004) that each include four fields: vendor, OS name, OS family, and device type. The fields are separated by the pipe symbol (|). Each field contains a single value. If a fingerprint represents more than one possible combination of these four fields, multiple Class lines are used.

The "vendor" is the company which makes an OS or device. Examples are Apple, Cisco, Microsoft, and Linksys. For community projects such as OpenBSD and Linux without a controlling vendor, the OS family name is repeated for the vendor column.

The "OS family" includes products such as Windows, Linux, IOS (for Cisco routers), Solaris, and OpenBSD. There are also hundreds of devices such as switches, broadband routers, and printers which use undisclosed operating systems. In some embodiments, if the underlying OS isn't clear, the "embedded" family is used.

The "OS generation" is a more granular description of the operating system. Generations of Linux include 2.4.X, and 2.6.X while Windows generations include 95/98/XP and NT/2K/Vista. FreeBSD uses generations such as 4.X and 5.X. For obscure operating systems which generally aren't subdivided into generations, or whenever the OS is listed as "embedded," this field is left blank.

The "device type" is a broad classification such as router, printer, or robotic pet. General purpose operating systems such as Linux and Windows are classified as general purpose.

FIG. 11 is a chart illustrating an example expression syntax. The syntax shown in FIG. 11 is used in some embodiments in conjunction with the reference fingerprints stored in reference database 122.

Typically a reference fingerprint is generalized from several target fingerprints of machines running a particular operating system. For example, some Windows XP machines return a window size of F424 to the T1 probe, while others return FAF0. This can be due to the particular Ethernet device driver in use, or how much memory is available.

One way to generalize a fingerprint is to simply remove tests that produce inconsistent results. In the above example, one could remove all of the window size tests from the reference fingerprint, and systems will match that fingerprint no matter what size they use. Removing tests can be useful in some situations. UDP and ICMP probes may be blocked by a firewall, so the lack of a response should typically not count against an OS match, and so they are sometimes removed.

The tradeoff is that important information can potentially be lost this way. If the only window sizes that a particular system ever sends are F424, and FAF0, the fingerprint can be customized to permit either of those two values, but not all 65,536 possibilities. When removing tests is undesirable, an expression syntax can be used to allow a test to match multiple values. For example, "W=F424|FAF0" would allow two Windows XP window values without allowing any others.

Matching Attributes with Operating Systems

Figure 12:
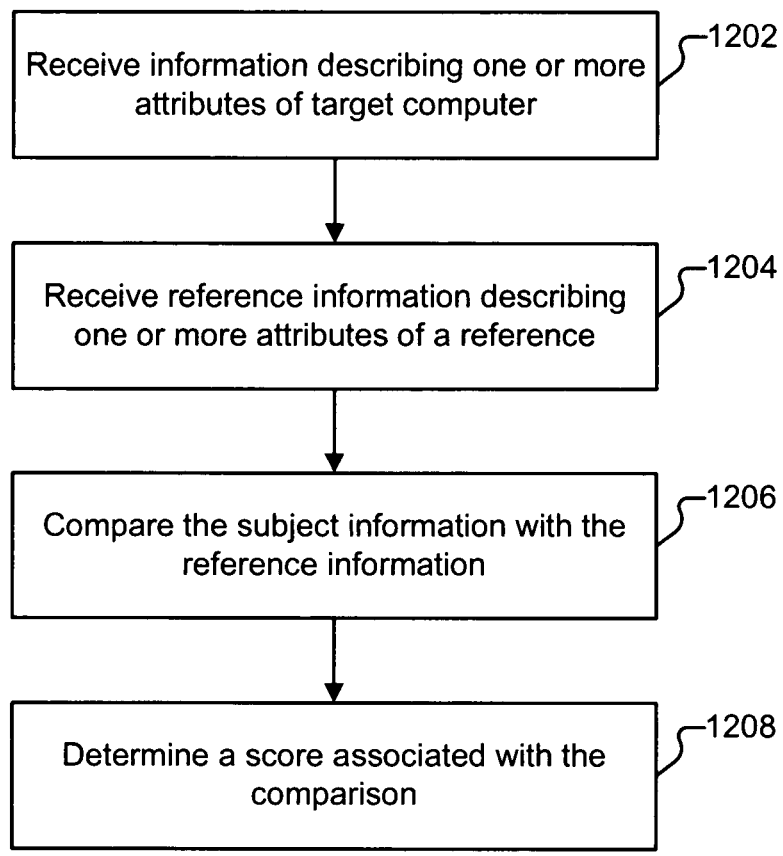
FIG. 12 illustrates an example of a process for determining the operating system of a target computer.

FIG. 12 illustrates an example of a process for determining the operating system of a target computer. In some embodiments the process shown in FIG. 12 is performed by detection system 102. In the example shown, the process begins at 1202 when information describing one or more attributes of a target computer is received. For example, at 1202, the target computer has been scanned by detection system 102 using the techniques described herein and a subject fingerprint has been generated from the results.

At 1204, information describing one or more attributes of a reference is received. For example, at 1204, a reference fingerprint is received from reference database 122.

At 1206, the subject information (e.g., received at 1202) is compared with the reference information (e.g., received at 1204). In some embodiments, the comparison is performed as follows. Detection engine 102 evaluates each probe category line from the subject fingerprint (such as SEQ or Ti) in turn. Any probe lines which do not exist in the reference fingerprint are skipped. When the reference fingerprint does have a matching line, they are compared.

For a probe line comparison, detection engine 102 examines every individual test (R, DF, W, etc.) from the subject category line in turn. Any tests which do not exist in the reference line are skipped. Whenever a matching test is found, detection engine 102 increments a "PossiblePoints" accumulator by the number of points assigned to the test (described in more detail below). The test values are then compared. If the reference test has an empty value, the subject test only matches if its value is also empty. If the reference test is a plain string or number (no operators), the subject test must match it exactly. If the reference string contains operators (|, –, >, or <), the subject must match as described according to the syntax, e.g. as described in conjunction with FIG. 11. When a test matches, a "NumMatchPoints" accumulator is incremented by the test's point value.

At 1208, a score associated with the comparison (e.g., performed at 1206) is determined. For example, once all of the probe lines are tested, detection engine 102 divides "NumMatchPoints" by "PossiblePoints." The result is a confidence factor describing the probability that the subject fingerprint matches that particular reference fingerprint. For example, a score of 1.00 indicates a perfect match and a score of 0.95 indicates a very close match. In some embodiments the process performed in FIG. 12 is repeated for each fingerprint of reference database 122 in sequence. The processing performed in FIG. 12 can also be parallelized, as applicable.

Once all of the reference fingerprints have been evaluated, detection engine 102 orders them and prints any perfect matches. If there are no perfect matches, in some embodiments detection engine 102 applies a threshold or other criteria to output candidates matches. Detection engine 102 can also be instructed to always display the "n" closest matches, or matches having a score above a certain threshold by use of a flag or other option.

FIG. 13 illustrates an example of a set of match points. In some embodiments the match points are used by detection system 102 in the process shown in FIG. 12. Reference database 122 includes a special entry (referred to herein as the "MatchPoints entry") that provides point values (non-negative integers) for each test, rather than test results. In various embodiments, other data structures may be used, as applicable.

In some embodiments tests listed in the MatchPoints structure only apply when found in the same test they are listed in. So a value given for the W (Window size) test in T1 does not affect the W test in T3. Detection system 102 may also be configured to assign points based on the test name alone, without considering grouping.

FIG. 14 illustrates examples of portions of information used in determining the operating system of a target computer. Portion 1402 is a portion of a subject fingerprint generated from scanning a target computer using the techniques described herein. Portion 1402 indicates the results of assorted ICMP-related tests. The results of seven tests are indicated, separated by percentage times. A test name and result value are included for each test. For example, "T=40" indicates that the initial TTL test had the result of 0x40.

Portion 1404 is a portion of a reference fingerprint for the "Microsoft Windows 2000 SP4" operating system stored in reference database 122. The reference fingerprint also indicates the results of seven ICMP-related tests, however, only six of the seven tests are in common with the portion shown at 1402. The "R" (response) test is only in the subject fingerprint (1402) and "TG" is only in the reference fingerprint (1404).

The remaining six tests in common ("DFI," "T," "TOSI," "CD," "SI," and "DLI") are compared. Beginning with "DFI," the subject fingerprint has a value of "N" and the reference has a value of "S." Those values do not match. For "T" the value is "40" in the subject fingerprint and "80181" (meaning either 80 or 81) for the reference. Those values also do not match, nor do the values for the "TOSI" or "CD" tests. However, the "SI" test is "S" for both fingerprints and "DLI" is also "S" for both fingerprints—matches in both cases.

Typically, all lines of the subject and reference fingerprints would be evaluated (e.g., using the processing described in conjunction with FIG. 12). In this example, only the excerpted IE tests have been evaluated. The scores for each of these tests can be determined by examining portion 1406, which is an excerpt of a MatchPoints entry included in reference database 122. Portion 1406 indicates how many points each of the individual tests is worth. The tests which matched (SI and DLI) are each worth 100 points, resulting in a total of 200 matched points out of the six tests compared. The total point value of the six tests used is 380 (40 (DFI)+15 (T)+25 (TOSI)+100 (CD)+100 (SI)+100 (DLI)). This leads to a match percentage of 200/380=53%. This is a very low percentage, indicating that the target computer (the source of the subject fingerprint) is very unlikely to be running the Windows 2000 (SP4) operating system.

Misidentified and Unidentified Targets

Reference database 122 typically includes a large number of reference fingerprints (including for devices such as game consoles, phones, cameras, interactive toys, set top boxes, etc.). Nonetheless, it is possible that detection system 102 may be unable to identify the operating system of a target computer successfully. If detection system 102 fails to identify a target computer correctly, a variety of techniques can be used to improve results.

In some embodiments when detection system 102 notices OS detection problems against a certain host, it will issue warnings. One example is: "Warning: OS detection will be MUCH less reliable because we did not find at least 1 open and 1 closed TCP port." It is possible that such ports really are unavailable on the machine, but retrying the scan on all ports may find some that are responsive for OS detection. Performing a UDP scan may also help in some circumstances.

Another approach that can be tried is to attempt a more aggressive guess. If detection system 102 indicates (e.g., via interface 124) that there are no matches close enough to print, a firewall or NAT box may be interfering with the probe or response packets. This can cause a hybrid situation in which one group of tests look like they are from one OS, while another set look completely different. Detection system 102 can be instructed to provide more clues, such as by providing it with a "-osscan-guess" option.

Another approach is to attempt the scan from another location. Typically, the more network hops a packet has to go through to reach its target, the greater the chances that a network device will modify (or drop) the probe or response. NAT gateways, firewalls, and port forwarding can confuse OS detection. Some ISPs filter traffic to "bad" ports, and others use transparent proxies to redirect certain ports to their own servers. Ports such as 25 and 80 may actually be spoofed by the ISP to connect to ISP proxy servers.

Another behavior which can confuse OS detection is when firewalls spoof TCP reset packets as if they are coming from the destination host. This is particularly common from port 113 (identd). Both the reset spoofing and transparent proxies can often be detected by noticing that every machine on a target network seems to exhibit the behavior—even those which otherwise seem to be down. If this situation occurs, those ports can be excluded from the scan so that they do not taint results.

In some cases (e.g., when the operating system is new or new patches/service packs are released), it is desirable to update reference database 122 to include additional or revised fingerprints. In various embodiments, detection system 102 is configured to receive periodic updates from a third party.

Detection system 102 may also prompt a user to provide more information about a target computer, if known. For example, a system administrator scanning a network maintained by the administrator may discover a new printer or other device for which there is no match in reference database 122. In such a scenario, detection system 102 may invite the administrator to physically examine the printer and provide details about its make, model, etc. and guide the administrator into making a new reference fingerprint. In some embodiments the administrator is requested to submit the fingerprint to a third party. For example, if detection system 102 scans a host and finds no perfect OS matches despite promising conditions (such as finding both open and closed ports accessible on the target), detection system 102 can be configured to print a subject fingerprint that shows all of the relevant test results and email the fingerprint to a particular email address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, including:
   a processor; and
   a memory coupled with the processor, wherein the memory is configured to provide the processor with instructions which when executed cause the processor to:
      set an option in a first ICMP query to a first state;
      set the option in a second ICMP query to a second state, wherein the first state of the option and the second state of the option are different;
      send the first and the second ICMP queries to the target computer;
      receive responses associated with the first and second ICMP queries from the target computer; and
      determine an attribute of the target computer comprising an indication of the behavior of the target computer with respect to the option at least in part by matching the received responses to a behavior classification in a set of candidate behavior classifications.

2. The system of claim 1 wherein determining the attribute of the target computer includes comparing the received responses against information included in the first and second ICMP queries.

3. The system of claim 1 wherein the first and second ICMP queries have different DON'T FRAGMENT bit settings, and wherein determining the attribute includes determining whether the target computer has the attribute that it echoes the DON'T FRAGMENT bit, always sets the DON'T FRAGMENT bit, or never sets the DON'T FRAGMENT bit.

4. The system of claim 1 wherein the first and second ICMP queries have different values set in their respective TYPE OF SERVICE fields, and wherein determining the attribute includes determining whether the target computer has the attribute that it echoes the TYPE OF SERVICE value, always sets the TYPE OF SERVICE value to zero, or always sets the TYPE OF SERVICE value to a non-zero value.

5. The system of claim 1 wherein the first and second ICMP queries have different CODE values, and wherein determining the attribute includes determining whether the target computer has the attribute that it echoes the CODE, always sets the CODE to zero, or always sets the CODE to a non-zero value.

6. The system of claim 1 wherein the first and second ICMP queries have different data payloads, and wherein determining the attribute includes determining whether the target computer has the attribute that it omits the data payload, echoes the data payload, or truncates the data payload.

7. The system of claim 1 wherein the first and second ICMP queries have different ICMP sequence numbers, and wherein determining the attribute includes determining whether the target computer has the attribute that it echoes the sequence number, always sets the sequence number to zero, or always sets the sequence number to a non-zero value.

8. The system of claim 1 wherein determining the attribute includes determining whether the target computer has the attribute that it generates ICMP IP IDs that are always zero, identical but non-zero, random, broken increments, or incremental.

9. The system of claim 8 wherein the memory is configured to provide the processor with instructions which when executed further cause the processor to determine a Shared IP ID Sequence Boolean.

10. The system of claim 1 wherein at least one response includes an ICMP response.

11. The system of claim 1 wherein at least one response includes at least one of an ICMP information response, an ICMP echo response, an ICMP timestamp response, and an ICMP netmask response.

12. The system of claim 1 wherein the first ICMP query includes at least one of an ICMP information request, an ICMP echo request, an ICMP timestamp request, and an ICMP netmask request.

13. A system including:
   a processor; and
   a memory coupled with the processor, wherein the memory is configured to provide the processor with instructions which when executed cause the processor to:
      send a first ICMP query with a first sequence number to a target computer;
      send a second ICMP query with a second sequence number different from the first sequence number to a target computer;
      receive responses associated with the first and second ICMP queries from the target computer; and determine an attribute of the target computer comprising an indication of the behavior of the target computer with respect to sequence numbers at least in part by matching the received response to a behavior classification in a set of candidate behavior classifications, wherein the set of candidate behavior classifications includes:
      a first candidate behavior classification that the target computer echoes sequence numbers;
      a second candidate behavior classification that the target computer sets sequence numbers to zero; and
      a third candidate behavior classification that the target computer sets sequence numbers to a non-zero value.

14. A system including:
   a processor; and
   a memory coupled with the processor, wherein the memory is configured to provide the processor with instructions which when executed cause the processor to:
      receive first and second ICMP responses from a target computer in response to sending a first ICMP query and a second ICMP query; and
      determine an attribute of the target computer comprising an indication of the behavior of the target computer with respect to ICMP IP ID generation at least in part by matching the received responses to a behavior classification in a set of candidate behavior classifications, wherein the set of candidate behavior classifications includes:

a first candidate behavior classification that the target computer generates ICMP IP IDs that are always zero;

a second candidate behavior classification that the target computer generates ICMP IP IDs that are identical but non-zero;

a third candidate behavior classification that the target computer generates ICMP IP IDs that are random; and a fourth candidate behavior classification that the target computer generates ICMP IP IDs that are incremental.

15. The system of claim 14 wherein the memory is configured to provide the processor with instructions which when executed further cause the processor to determine a Shared IP ID Sequence Boolean.

16. A method of determining an attribute of a target computer, including:

setting an option in a first ICMP query to a first state;

setting the option in a second ICMP query to a second state, wherein the first state of the option and the second state of the option are different;

sending the first and the second ICMP queries to the target computer;

receiving responses associated with the first and second ICMP queries from the target computer; and determining an attribute of the target computer comprising an indication of the behavior of the target computer with respect to the option at least in part by matching the received responses to a behavior classification in a set of candidate behavior classifications.

17. A computer program, the computer program product being embodied in a non-transitory computer readable medium and comprising computer instructions for:

setting an option in a first ICMP query to a first state;

setting the option in a second ICMP query to a second state, wherein the first state of the option and the second state of the option are different;

sending the first and the second ICMP queries to the target computer;

receiving responses associated with the first and second ICMP queries from the target computer; and determining an attribute of the target computer comprising an indication of the behavior of the target computer with respect to the option at least in part by matching the received responses to a behavior classification in a set of candidate behavior classifications.

18. The system of claim 14 wherein the fourth candidate behavior classification comprises a classification that the target computer generates ICMP IDs that are incremental in host byte order.

19. The system of claim 14 wherein the fourth candidate behavior classification comprises a classification that the target computer generates ICMP IDs that are incremental in network byte order.

20. The system of claim 14 wherein the fourth candidate behavior classification comprises a classification that the target computer generates ICMP IDs that are sequential.

* * * * *

UNITED STATES PATENT AND TRADEMARK OFFICE
CERTIFICATE OF CORRECTION

PATENT NO. : 8,676,963 B1  
APPLICATION NO. : 11/881997  
DATED : March 18, 2014  
INVENTOR(S) : Lyon et al.

Page 1 of 1

It is certified that error appears in the above-identified patent and that said Letters Patent is hereby corrected as shown below:

In the claims

In column 19, line 14, claim 16 delete "of determining an attribute of a target computer".

Signed and Sealed this  
Twenty-eighth Day of June, 2016

Michelle K. Lee  
*Director of the United States Patent and Trademark Office*